United States Patent
Bagavath-Singh et al.

(10) Patent No.: US 12,179,284 B2
(45) Date of Patent: Dec. 31, 2024

(54) VISION-BASED ROTARY PART OFFSET CORRECTION FOR WELD TOOLPATHING

(71) Applicant: DM3D Technology, LLC, Auburn Hills, MI (US)

(72) Inventors: Vijayavel Bagavath-Singh, Troy, MI (US); Jason Franceschina, Leonard, MI (US); Mark Lewan, White Lake, MI (US); Bhaskar Dutta, Troy, MI (US)

(73) Assignee: DM3D Technology, LLC, Auburn Hills, MI (US)

( * ) Notice: Subject to any disclaimer, the term of this patent is extended or adjusted under 35 U.S.C. 154(b) by 181 days.

(21) Appl. No.: 17/459,094

(22) Filed: Aug. 27, 2021

(65) Prior Publication Data

US 2022/0063018 A1  Mar. 3, 2022

Related U.S. Application Data

(60) Provisional application No. 63/071,218, filed on Aug. 27, 2020.

(51) Int. Cl.
*B23K 26/08* (2014.01)
*B23K 26/24* (2014.01)

(52) U.S. Cl.
CPC .......... *B23K 26/0892* (2013.01); *B23K 26/24* (2013.01)

(58) Field of Classification Search
CPC .... B23K 26/032; B23K 26/044; B23K 26/24; B23K 26/0892; B23K 26/30; B23K 26/0823

(Continued)

(56) References Cited

U.S. PATENT DOCUMENTS

| 5,045,668 A * | 9/1991 | Neiheisel ............. B23K 26/147 219/121.84 |
| 5,925,268 A * | 7/1999 | Britnell .............. B23K 26/0884 219/121.79 |

(Continued)

FOREIGN PATENT DOCUMENTS

| CN | 106825914 A * | 6/2017 | ........... B23K 26/032 |
| CN | 108907456 A * | 11/2018 | ........... B23K 26/044 |

(Continued)

OTHER PUBLICATIONS

WO 2016041768 A1 description english translation.*
CN-109822216-A english translation (Year: 2019).*
CN-111215763-A english translation (Year: 2020).*

*Primary Examiner* — Dana Ross
*Assistant Examiner* — James F Sims, III
(74) *Attorney, Agent, or Firm* — WARNER NORCROSS + JUDD LLP

(57) ABSTRACT

An improved laser weld process control system and method are provided. The system and method include a machine vision camera to detect a deviation between a pre-programmed laser beam toolpath and a gap centerpoint between first and second parts being welded together. The first and second parts are secured to a rotatable fixture, and the system and method cause the rotatable fixture to rotate through a corrective angle to bring the gap centerpoint into alignment with the laser beam toolpath, optionally in real time during the application of laser beam energy. The system and method can also correct for a vertical misalignment of the laser focal point due to rotation of the fixture by adjusting the vertical separation of the laser unit relative to the fixture.

5 Claims, 4 Drawing Sheets

(58) Field of Classification Search
USPC .................................................. 219/121.64
See application file for complete search history.

(56) References Cited

U.S. PATENT DOCUMENTS

| | | | | |
|---|---|---|---|---|
| 5,961,858 A * | 10/1999 | Britnell | ................ | B23K 26/067 |
| | | | | 219/121.81 |
| 6,040,550 A * | 3/2000 | Chang | ................ | B23K 26/0823 |
| | | | | 219/121.64 |
| 7,107,118 B2 | 9/2006 | Orozco et al. | | |
| 2001/0008231 A1* | 7/2001 | Britnell | .................. | B23K 26/04 |
| | | | | 219/121.61 |
| 2013/0043225 A1* | 2/2013 | Schurmann | .......... | B23K 26/044 |
| | | | | 219/121.64 |
| 2016/0016261 A1* | 1/2016 | Mudd, II | ............. | B23K 26/242 |
| | | | | 219/121.64 |
| 2016/0368089 A1* | 12/2016 | Grapov | ............... | B23K 26/0676 |
| 2017/0036300 A1* | 2/2017 | Takashima | ............... | B22F 12/52 |
| 2019/0143458 A1* | 5/2019 | Strebel | ................. | B23K 26/032 |
| | | | | 219/121.64 |
| 2019/0227525 A1 | 7/2019 | Mehr et al. | | |

FOREIGN PATENT DOCUMENTS

| | | | | | |
|---|---|---|---|---|---|
| CN | 109822216 A | * | 5/2019 | | |
| CN | 111069787 A | * | 4/2020 | | |
| CN | 111215763 A | * | 6/2020 | | |
| DE | 102006049627 A1 | * | 4/2008 | ............ | B25J 9/1015 |
| DE | 102007030395 B4 | * | 9/2010 | ........... | B23K 26/044 |
| DE | 102017126697 A1 | | 5/2019 | | |
| DE | 102020116914 A1 | * | 12/2020 | ........... | B23K 26/032 |
| KR | 20140056774 A | * | 5/2014 | | |
| WO | WO-0029166 A1 | * | 5/2000 | ........... | B23K 26/032 |
| WO | WO-2016041768 A1 | * | 3/2016 | ........... | B23K 26/032 |

\* cited by examiner

VISION-BASED ROTARY PART OFFSET CORRECTION FOR WELD TOOLPATHING

CROSS-REFERENCE TO RELATED APPLICATIONS

This application claims the benefit of U.S. Provisional Application 63/071,218, filed Aug. 27, 2020, the disclosure of which is incorporated by reference in its entirety.

FIELD OF THE INVENTION

The present invention relates to laser weld processing in a computer numerical control (CNC) machine. More specifically, the present invention relates to laser weld processing using a vision-based rotary part offset sensing method and applying corrections to a computer aided manufacturing (CAM) software generated toolpath program.

BACKGROUND OF THE INVENTION

Laser beam welding uses a highly focused laser beam for joining two parts. The laser beam provides a concentrated heat source, and its control is typically automated according to a toolpath instruction set. Filler metal may or may not be used during laser beam welding, and it yields excellent weld precision with little thermal damage to the parts being joined.

When laser beam welding workpieces having a three-dimensional shape, corrections in the CAM generated laser toolpath are required due to slight variations in actual workpiece forms and dimensions. Vision-based seam tracker systems are currently available for real-time toolpath correction during laser beam welding. Corrections are generally limited to the vertical and lateral translation of the laser unit or the workpiece, however. As a result, in some instances the laser unit produces a laser beam that is no longer normal to the gap between adjacent parts, particularly for workpieces having a complex three-dimensional geometry.

Accordingly, there remains a continued need for a vision-based part offset sensing method for toolpath correction for joining complex workpieces by laser beam welding.

SUMMARY OF THE INVENTION

An improved laser weld process control system and method are provided. The control system and method provide for pointwise correction using vision-based part offset sensing for a weld toolpath, and provides a significant improvement in the precision welding of three-dimensional shapes using a motion system with a rotary axis and three linear axes.

In one embodiment, the system and method include a machine vision camera to detect a deviation between a CAM generated laser beam toolpath and a gap centerpoint between first and second parts being welded together. The first and second parts are secured to a rotatable fixture, and the rotatable fixture rotates through a corrective angle to bring the gap centerpoint into alignment with the laser beam toolpath, optionally in real time during the application of laser beam energy. The system and method can also correct for a vertical misalignment of the laser focal point due to rotation of the fixture by adjusting the vertical separation of the laser unit relative to the fixture. The vertical misalignment measurement is facilitated by mounting the camera at an angle along the seam line rather than vertically above the seam line.

In another embodiment, the laser unit moves at a constant speed and follows the preprogrammed toolpath created from CAM data for the first and second parts. The machine vision camera continuously images the gap between the first and second parts and determines the location of the gap centerpoint in a workspace reference frame. Based on the machine vision camera output, a control unit detects a deviation between the preprogrammed toolpath and the gap centerpoint. The control unit then causes the rotatable fixture to rotate and causes the laser unit or the fixture to shift, thereby bringing the focal point of the laser beam into alignment with the gap centerpoint between the first and second parts, optionally within an acceptable margin of error.

These and other features and advantages of the present disclosure will become apparent from the following description of particular embodiments, when viewed in accordance with the accompanying drawings and appended claims.

DETAILED DESCRIPTION OF THE CURRENT EMBODIMENT

The current embodiment includes a system and a method for real-time weld toolpath correction for laser beam welding. The system includes a workpiece mounted to a rotatable fixture beneath a laser unit that is moveable vertically and horizontally. The method includes detecting, using a machine vision system, a deviation between a laser beam toolpath and a gap centerpoint between first and second parts being welded together. The method further includes determining a correction offset about a rotary axis and determining a correction offset in at least the vertical direction to align the laser beam focal point with the gap centerpoint.

Figure 1:
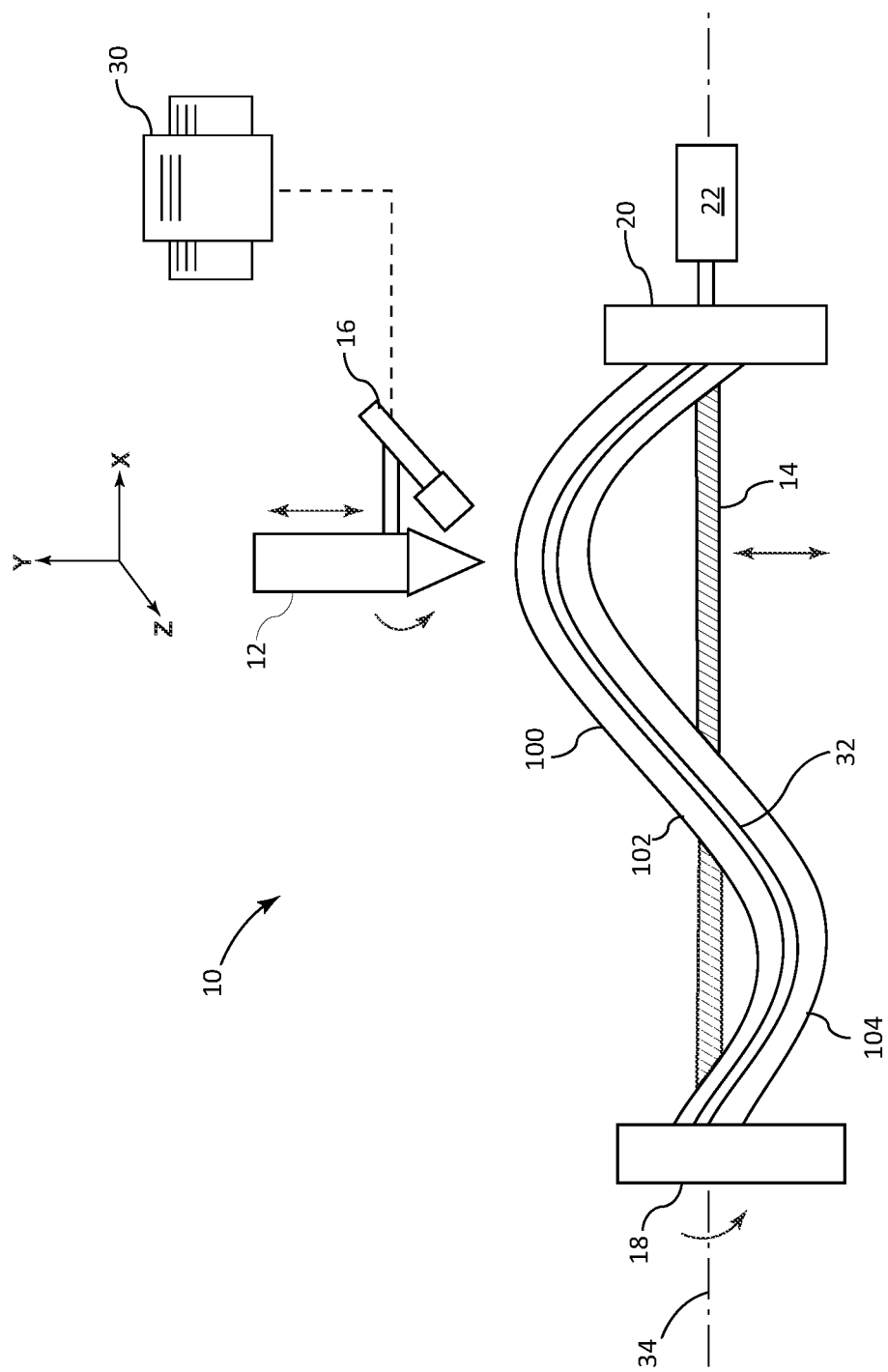
FIG. 1 is a schematic view of a workpiece (top view) on a rotating axis with a camera on a linear vertical axis.

Referring now to FIG. 1, a system for real-time weld toolpath correction is illustrated and generally designated 10. The system 10 includes a laser unit 12 positioned above a workpiece 100 that is mounted to a rotatable fixture 14. The laser unit 12 includes an internal laser, a lens, a nozzle, and an optional port for a shielding gas that is blown through the nozzle coaxially with the laser beam to protect the weld. The laser unit 12 also includes a camera 16 that is oriented toward the focal point of the laser beam. The camera 16 provides an output to a control unit 30 for detecting the presence of an offset between the toolpath and the gap centerpoint. The camera is mounted at an angle along the seam line and not vertically above the seam line. Though not shown, the system 10 includes an appropriate power supply for operation of the laser unit 12.

Figure 2:
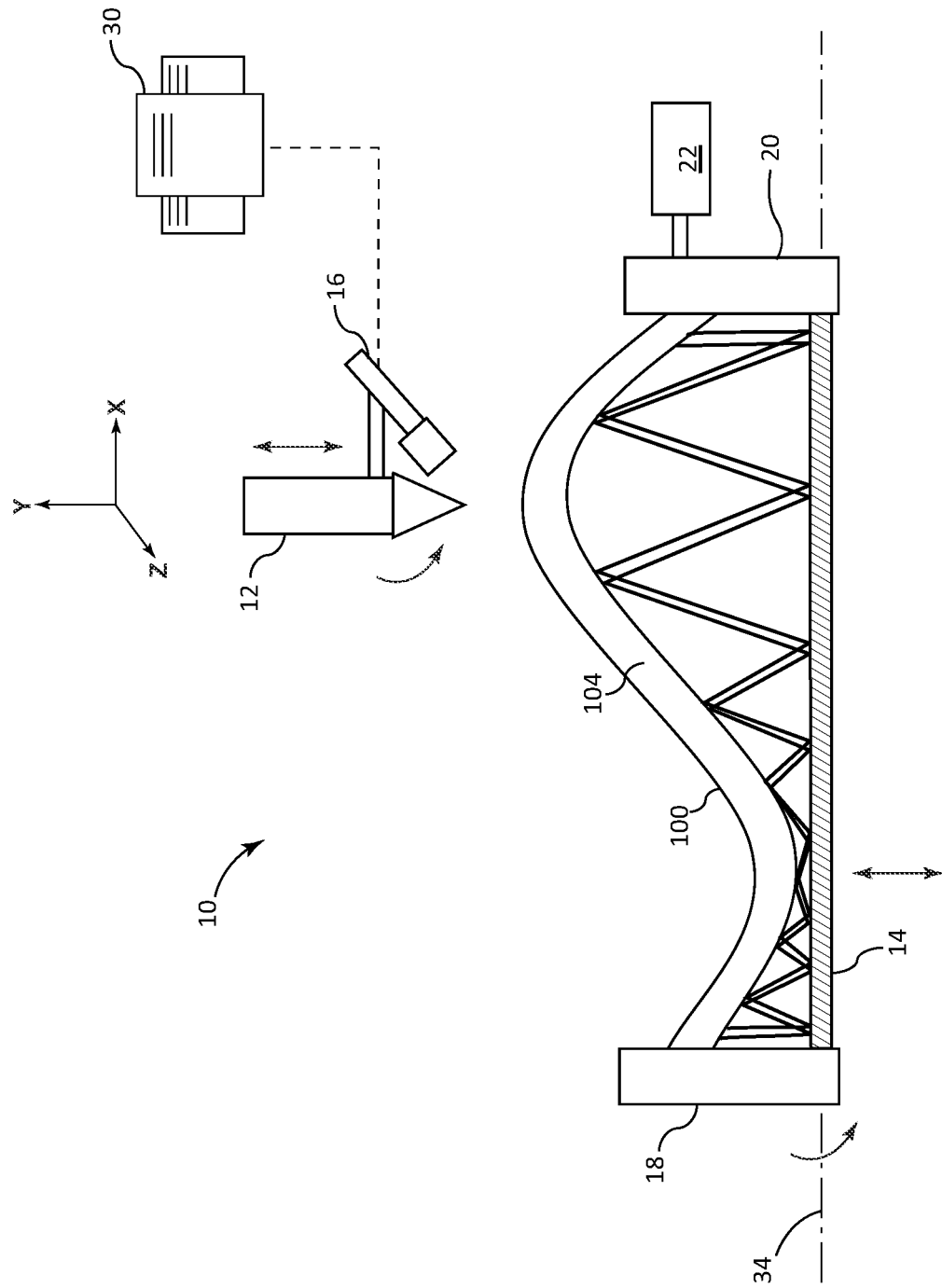
FIG. 2 is a schematic view of a workpiece (side view) on a rotating axis with a camera on a linear vertical axis.

The fixture 14 is generally an elongated platform that is rotatable about the A-axis 34, which is parallel to the X-axis in the embodiment of FIG. 1. The fixture 14 includes a tail-stock 18 and a head-stock 20 for securing the workpiece 100 to the fixture 14. The fixture 14 includes a rotary axis motor 22, responsive to the control unit 30, for precision adjustments of the angular position of the workpiece 100. As noted above, the workpiece 100 is defined by two parts 102, 104 that are separated by a gap 32. The gap 32 is visible in FIG. 1, which includes a top-down view of the workpiece 100. In this top-down view, the lateral geometric variation of the workpiece is visible. In the side-view of FIG. 2, the vertical geometric variation of the workpiece is visible. As the workpiece 100 extends along the X-axis, it varies along the Y-axis and in the Z-axis in a sinusoidal manner. This workpiece 100 of FIGS. 1-2 is merely one example, and the present invention is well suited for laser beam welding and toolpath correction of other workpieces.

The control unit 30 can include a graphical user interface (GUI) to display the laser's operation data to an operator. Laser operations are sequenced by the control unit 30, which includes embedded software for converting the output of the machine-vision camera 16 into joint geometry data, and more specifically, the gap centerpoint. The machine-vision camera 16 is optionally a CMOS-based camera, and the control unit 30 includes a closed-loop control algorithm that monitors the gap centerpoint, controls the weld process, and, if necessary, intervenes in the weld process to align the gap centerpoint with the weld toolpath.

In operation, the laser unit 12 moves at a constant speed and follows a preprogrammed toolpath created from the CAM data for the workpiece 100. The camera 16 continuously images the geometry of the workpiece 100 as the laser unit moves along the preprogrammed toolpath. Based on the camera output, the control unit 30 corrects the toolpath to compensate for errors in the location of the laser focal point. The errors can be measured and calculated in a reference frame in the three-dimensional workspace of the laser beam welding system. The fixture 14 is then rotated and/or the laser unit 12 is shifted by mathematical transform in the reference frame of the workpiece. For example, the camera 16 provides image frame data to the control unit 30, which extracts workpiece geometry data. The workpiece geometry data can include, for example, gap data, including the X-Y coordinates of the gap centerpoint. The control unit 30 determines whether a deviation exists between the preprogrammed toolpath for the laser focal point and the gap centerpoint. For example, if the preprogrammed toolpath does not overlie the gap centerpoint, within an acceptable margin of error, a correction may be required. The control unit 30 uses the workpiece geometry data to determination the appropriate correction.

Figure 3:
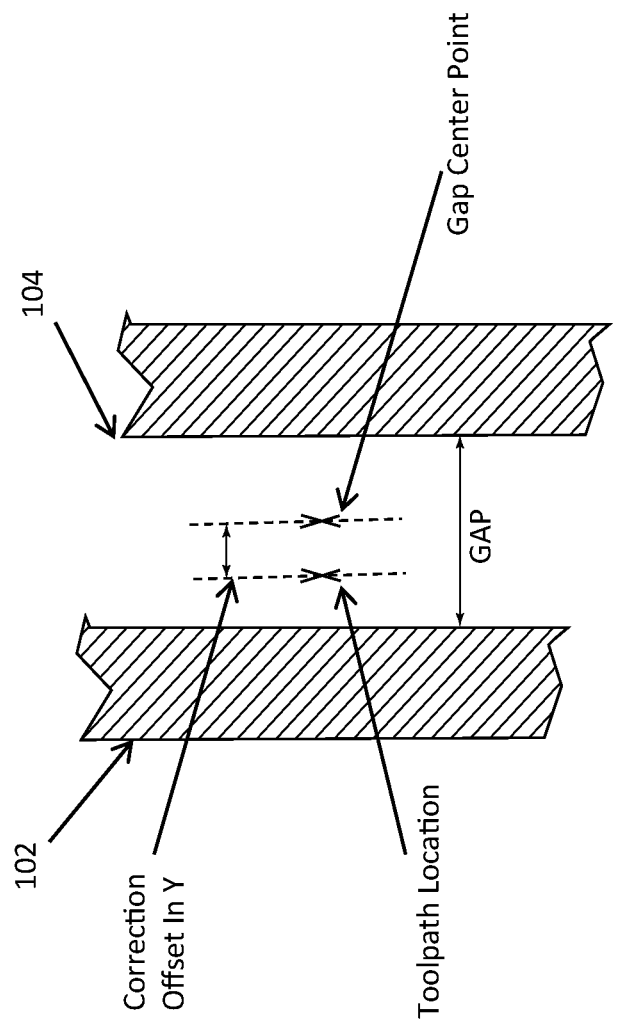
FIG. 3 is a top-down view of a gap between adjacent parts illustrating a correction offset between the toolpath location and the gap center point.
Figure 4:
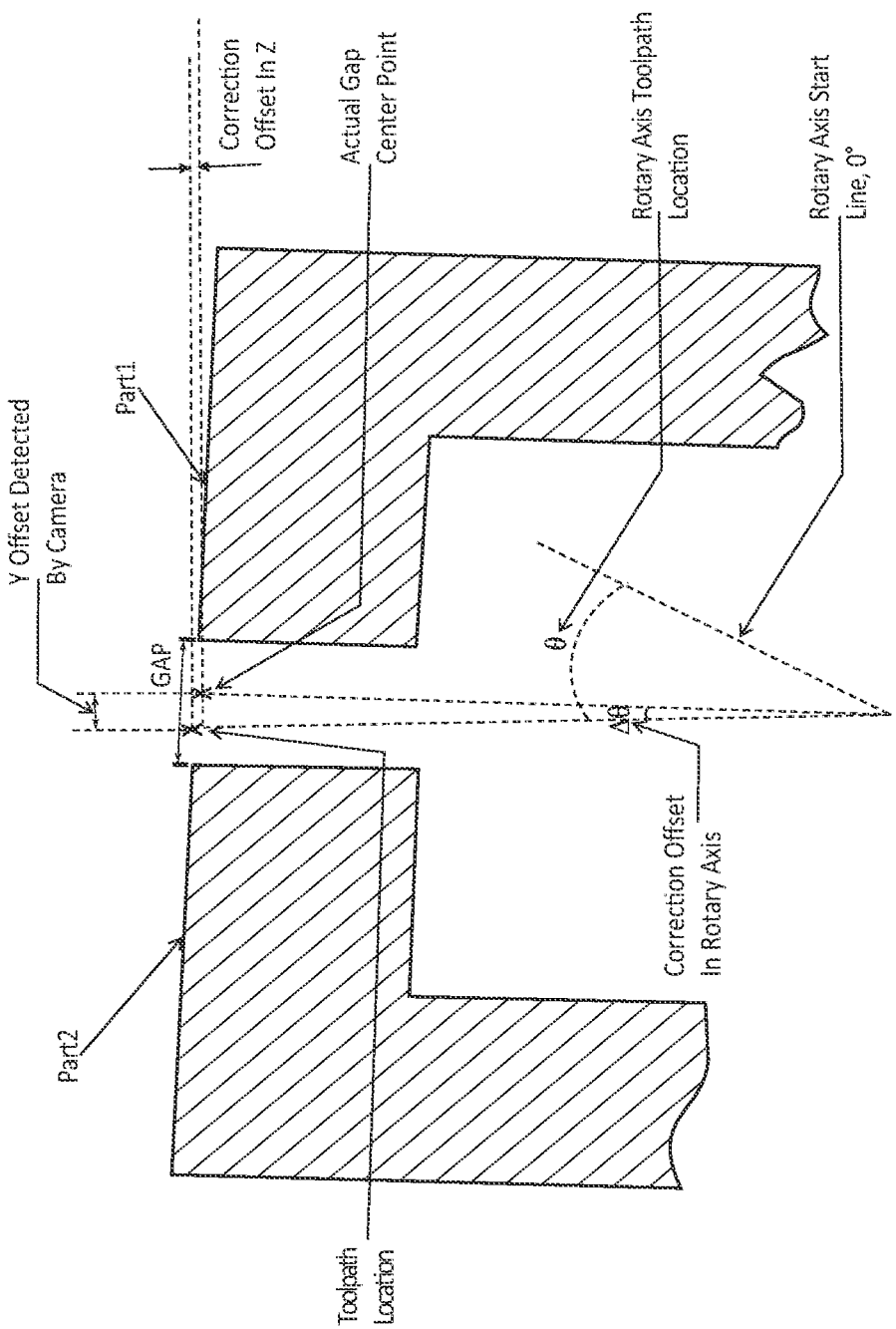
FIG. 4 is a sectional view of a gap between adjacent parts illustrating a correction offset with rotation of the workpiece about the rotating axis.

By non-limiting example, FIGS. 3-4 depict a preprogrammed toolpath that is offset from the gap centerpoint in the Y-direction ($\Delta Y$) and in the Z-direction ($\Delta Z$). In this example, the control unit 30 detects this offset based on the camera output and calculates the appropriate rotation of the fixture 14 about the A-axis by an amount $\Delta \theta$ according to the following equation (1), where R is the distance between the A-axis and the gap centerpoint and is a known variable:

$$\Delta \theta = \sin^{-1}(\sqrt{(\Delta Y^2 + \Delta Z^2)}/R) \tag{1}$$

The control unit 30 causes the fixture to rotate about the A-axis through an angle of rotation $\Delta \theta$ by operation of the rotary axis motor 22. The control unit 30 also causes a vertical adjustment of the laser unit 12 or the fixture 14 to bring the laser focal point in alignment with the gap centerpoint. Though not shown in FIGS. 1-4, the adjustments can also include rotation of the laser unit 12 about the X and Y axes, such that the laser beam is perpendicular to the gap between adjacent parts 102, 104. For example, the control unit 30 can cause the laser unit 12 to rotate about the Y-axis to ensure the laser beam is orthogonal to the gap between the first and second parts 102, 104.

The above description is that of current embodiments. Various alterations can be made without departing from the spirit and broader aspects of the invention as defined in the claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A method for controlling an automated welding process, the method comprising:
   securing a workpiece to a rotatable fixture, the workpiece being rotatable in unison with the rotatable fixture about an axis of rotation (X-axis), the workpiece including first and second parts defining a gap therebetween;
   providing a laser above the rotatable fixture for welding the first part to the second part, the laser being operable to generate a laser beam according to a preprogrammed laser beam toolpath;
   providing a machine vision camera oriented toward the workpiece, the workpiece being secured to the rotatable fixture, the machine vision camera being fixed in relation to the laser;
   measuring a deviation between the laser beam toolpath and a gap centerpoint of the gap between the first and second parts of the workpiece that are being welded together, the gap centerpoint being separated from the axis of rotation (X-axis) by a first distance (R), the deviation including a horizontal (Y-axis) offset ($\Delta Y$) and a vertical (Z-axis) offset ($\Delta Z$), wherein the Y-axis and the Z-axis are orthogonal to the axis of rotation (X-axis);
   calculating the deviation between the laser beam toolpath and the gap centerpoint, including the vertical (Z-axis) offset and the horizontal (Y-axis) offset, such that the deviation can be corrected in at least two dimensions;
   correcting the deviation by causing the fixture to rotate about the axis of rotation (X-axis) through an angle of rotation ($\Delta \theta$) to bring the gap centerpoint into alignment with the laser beam toolpath, wherein the angle of rotation ($\Delta \theta$) is determining according to $\sin^{-1}((\sqrt{(\Delta Y^2 + \Delta Z^2)})/R)$; and
   after correcting the deviation, welding, using the laser, the first part of the workpiece to the second part of the workpiece.

2. The method of claim 1 further including causing the laser to raise or lower relative to the rotatable fixture.

3. The method of claim 1 further including causing the rotatable fixture to raise or lower relative to the laser.

4. The method of claim 1 wherein the workpiece includes a geometric shape that varies in a vertical dimension and in a horizontal dimension.

5. The method of claim 1 wherein the fixture includes a tail stock and a head stock for securing the workpiece to the rotatable fixture.

* * * * *